United States Patent [19]
Wemyss

[11] 3,866,469
[45] Feb. 18, 1975

[54] RECTANGULAR FLOWMETER

[75] Inventor: William Alexander Wemyss, Great Missenden, England

[73] Assignee: B. Rhodes & Son Limited, Romford, Essex, England

[22] Filed: Dec. 13, 1973

[21] Appl. No.: 424,536

[30] Foreign Application Priority Data
Dec. 13, 1972  Great Britain................... 57518/72
Apr. 10, 1973  Great Britain................... 17141/73

[52] U.S. Cl. ................................................. 73/229
[51] Int. Cl. .............................................. G01f 1/06
[58] Field of Search............................. 73/229, 230

[56]             References Cited
UNITED STATES PATENTS
2,525,914   10/1950   Knauth .................................. 73/229
2,963,907   12/1960   Sylvest ................................... 73/229

*Primary Examiner*—Jerry W. Myracle
*Attorney, Agent, or Firm*—Allison C. Collard

[57]               ABSTRACT

A fluid flowmeter comprising a rotor with radially-directed, axially-extending blades borne for rotation within a chamber of rectangular cross-section wherein the blades are exposed to a substantially tangential flow. The number of revolutions imparted to the rotor thereby are counted as a measure of the fluid passed. Rods are situated in one or more corners of the chamber to guide the flow around the chamber by the promotion of stable fluid vortices in the corners.

13 Claims, 6 Drawing Figures

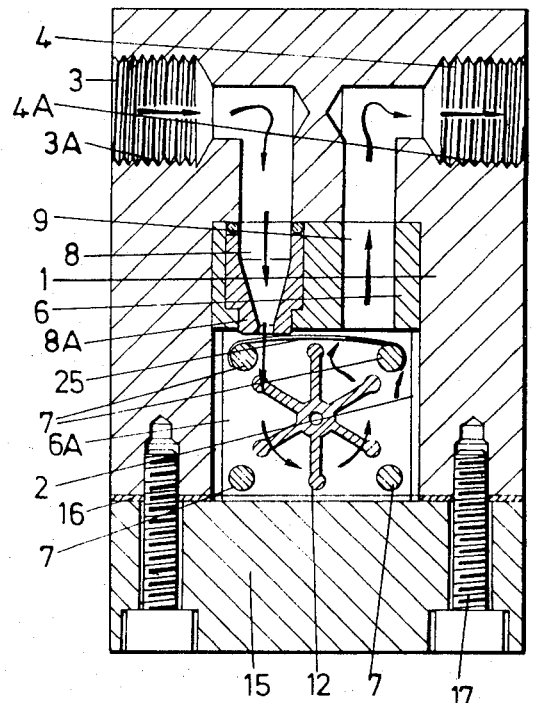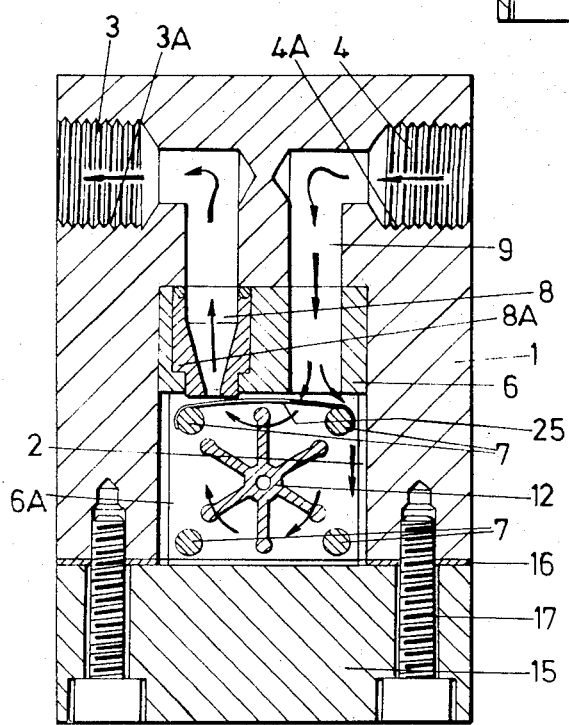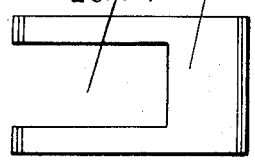

RECTANGULAR FLOWMETER

This invention relates to flowmeters especially for liquids and of the general kind which involve a rotor with radially-directed, axially-extending blades which are exposed within a channel to a substantially tangential flow. Such rotors are reminiscent of an undershot water wheel, or a Pelton-wheel turbine. Various forms of such device have been proposed as flowmeters, and it is an aim of the present invention to provide a very simple construction which, judging by empirical results achieved in tests, affords highly consistent accuracy of measurement of very small flows (such as may, for example, be required in experiments of laboratory scale, or in medical or surgical treatment, or in chemical processes in which small rather than gross flow metering is required). The invention lends itself to measurements of very small flow, not only because it is sensitive functionally but because it can economically be constructed on very small scale. By "very small" in flow we exemplify 50 c.c per minute of a liquid.

According to the invention a fluid flowmeter comprises a body defnining a chamber of substantially rectangular cross-section having four side walls extending between substantially parallel top and bottom walls, a metering rotor having radially-directed, axially-extending blades borne for rotation within the chamber, means defining a fluid inlet and outlet opening to the chamber in the same or different side walls of the chamber, the inlet including a nozzle for directing a jet of incoming fluid towards and substantially tangential to the rotor, means arranged within the chamber for guiding such incoming fluid around the chamber to the outlet which means comprises a rod-like member extending between said top and bottom walls situated in one or more corners of the chamber, the axis of the or each such member being parallel with that of the rotor, and means for sensing the number of revolutions of the rotor to signal the amount of fluid passed.

Such a rod-like member may be situated in each corner of the chamber encountered by fluid flowing around the chamber from the inlet to the outlet, although it may be found that depending on the lay out of any particular meter, the guiding action of these members (which is explained below) is more or less pronounced in any particular corner, so that the number of members employed may be so selected in each case as to provide for optimum performance of the meter.

In one example the inlet and outlet openings are in the same side wall of the chamber, so that fluid entering the chamber via the inlet is turned through 180° before leaving via the outlet, and a rod-like member is situated in one or both of the two corners remote from said side wall. If the inlet and outlet are sufficiently spaced from the next nearest side wall, a rod-like member may be situated in one or both of the two corners adjacent to said same side wall. Thus, such a member may be situated in all four corners of the chamber.

The presence of the rod-like members in the corners of the chamber has been found to improve the linearity of flowmeters in which they are employed, and it is believed that such a member promotes the formation in the respective corner of a fluid vortex having an axis of revolution substantially coincident with the axis of the member, and that the vortex adheres to the surface of the member by virtue of the Coanda effect. Thus there appears to result a stable circulation of what may be effectively stagnant fluid, which reacts with the "mainstream" fluid within the chamber to assist in guiding it around the chamber, tending to prevent turbulence at the corner. In this context, "stagnant" is intended to mean not significantly changing.

It may be provided, if so required, that the rod-like members are adjustable as to their position, and furthermore the alignment of the nozzle relative to the rotor may also be adjustable.

The nozzle may have an elongated mouth directed substantially parallel with the axis of the rotor.

The means employed for sensing the number of revolutions of the rotor may be of any convenient conventional form, and many such means will be apparent to those skilled in the art; however, in preferred arrangement at least one rotor blade embodies a magnetic element in its tip to cause pulses in an inductive sensor in proximity to the chamber, thereby sensing the number of revolutions of the rotor.

It is often required with flowmeters as above defined, particularly when used in the medical and surgical, or pharmaceutical or food processing fields, to clean or sterilize their internal passages and this is popularly achieved by injecting steam into the meters. However, the flow velocities experienced by a meter during this process are usually far in excess of those for which it is designed and consequently a subtantial risk of damage to the rotor bearings is run if steam is applied to an unprotected meter and the rotor is allowed to rotate at speeds outside its normal operational range. Such a state of affairs is often referred to as "bursting" a rotor.

Thus, in another aspect, the present invention seeks to provide for safe steam cleaning of a flowmeter as above-defined, and to this end means may be provided in the region of the outlet opening to the chamber to deflect a flow of fluid entering the chamber from the outlet from impingement on the rotor sufficient to overspeed the same.

Thus the flowmeter can operate normally under forward flow conditions and be safely cleaned by a flow of steam applied to the outlet, i.e., a reverse flow of steam.

In one form, such means comprises a baffle member arranged to partially occlude the outlet opening so as to direct a reverse flow of fluid around the chamber to the inlet with components of direction tending to rotate the rotor in both senses, any net rotation being within the normal operational range of the rotor, and the baffle member may be so arranged that the net rotation is substantially zero.

In a flowmeter where the inlet and outlet openings are in the same side wall of the chamber and sufficiently spaced from the next nearest side wall for a rod-like member to be situated in each of the two corners adjacent to said same side wall, the baffle member may advantageously be in the form of a clip sprung over those two rod-like members, the clip being notched to allow unimpeded forward flow from the inlet but leaving a portion partially occluding the outlet opening.

The invention will now be more particuarly described, by way of example, with reference to the accompanying drawings, in which.

Figure 1:
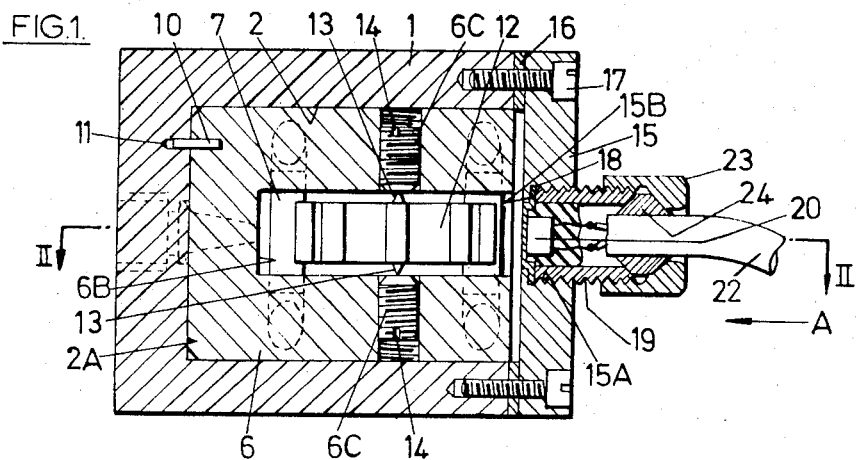
FIG. 1 is a sectional elevation of a first embodiment of a flowmeter according to the invention.
Figure 2:
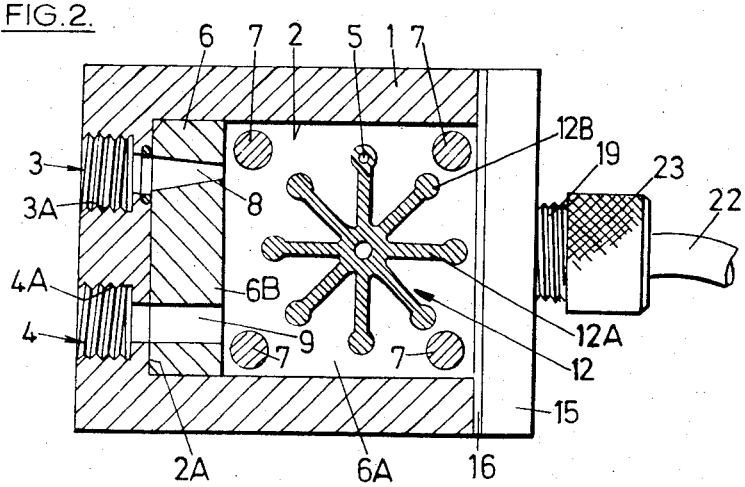
FIG. 2 is a section on the line II —II of FIG. 1.

FIGS. 4 and 5 are sectional views similar to FIG. 2 of a second embodiment of the invention, protected for the purposes of steam cleaning, in forward and reverse flow conditions. Like reference numerals are used in FIGS. 4 and 5 to denote similar features to those shown in FIGS. 1 to 3; and FIG. 6 illustrates the form of a baffle member employed in the flowmeter of FIGS. 4 and 5.

Referring first to FIG. 1, a flowmeter comprises a hollow cylindrical body 1 having a co-axial bore 2 closed at one end (2A) and provided with two fluid passages 3 and 4, each internally threaded at 3A and 4A respectively in order to receive a threaded pipe connector (not shown).

Into bore 2 is inserted a rotor block comprising a cylindrical member 6 in which is formed a slot 6A, and which block is provided with a passage 8 defining a nozzle and another passage 9, both passages being so situated that they align with passages 3 and 4 respectively and provide therewith an inlet and outlet for fluid into and from the volume or chamber bounded by slot 6A and bore 2 of body 1.

A pin 10 protruding from the end of block 6 engages with hole 11 in the body 1 in order to ensure correct alignment of all the passages.

A paddle-like rotor 12, having bearing pivots 13 each side thereof, is mounted for rotation within slot 6A being borne therein by jewelled bearings 14 which adjustably and threadedly engage with co-axial threaded bores 6C in the block 6. The rotor 12 comprises a number of radial blades 12A, each terminating in a somewhat bulbous portion 12B thereof in which is embedded a small rod of ferrite material such as indicated at 5. The rotor 12 and nozzle 8 are so positioned that, fluid emerging from nozzle 8 will impinge upon rotor blades adjacently to the bulbous portions 12B and in a direction substantially tangential to a circumference of the rotor.

Situated in each corner of the slot 6A is a circular-section rod 7, each borne in a bore 6D in the rotor block 6, in which a rod 7 is a press fit, the rods extending across the slot 6A between parallel surfaces 6E and 6F thereof, their axes substantially parallel with the rotor axis. As clearly seen in FIG. 2, each rod is spaced from the walls adjacent thereto so that fluid may circulate freely between rod and walls.

The rotor chamber, formed by slot 6A and the portion of bore 2 bounding the slot, is fluidly closed by a cover 15 and sealing gasket 16 which are attached to body 1 by screws 17. The cover incorporates an inductive sensor extending through it and in threaded engagement with bore 15A in the cover, which sensor comprises; an externally threaded hollow body 19; an inductor 20 embedded therein with e.g. epoxy resin; an electrical cable 22 connected to the inductor 20 and leading to known electronic equipment which determines the rate of rotor 12 rotation by detecting cyclic changes in value of inductance of inductor 20 as the ferrite elements 5 in the blade portions 12B pass proximal thereto when the rotor 12 rotates; a gland nut 23, and sealing element 24 cooperating therewith which grips cable 22 and creates a seal between it and the sensor body 19. The sensor body 19 when screwed into bore 15A compresses a plastics sealing element 18 against shoulder 15B and thus creates a seal against fluid in the chamber.

An advantage of the form of construction described herein with reference to the drawings, is that the rotor block may be readily changed without disturbing the pipework to which the flowmeter may be attached for measurement of flow therethrough.

In a variant, nozzle 8 may comprise an insert eccentrically bored and rotatably mounted in block 6, thus providing for adjustment of the fluid jet relative to the rotor. Such an insert is indicated at 8A in the FIGS. 4 and 5 example of the invention.

The rod or rods whilst preferably of circular section may be of other (e.g. eliptical) section. Their ends where they are supported in the bores 6D may be made eccentric so that by rotating a rod its exact location in the rotor chamber may be selected; and is expected that selection may be determined empirically. This adjustment may be found to be of importance particuarly with respect to the rod immediately adjacent nozzle 8. Also, and as indicated above, the number of rods employed in any chamber may similarly be selected so as to provide for optimum performance of the meter.

Figure 3:
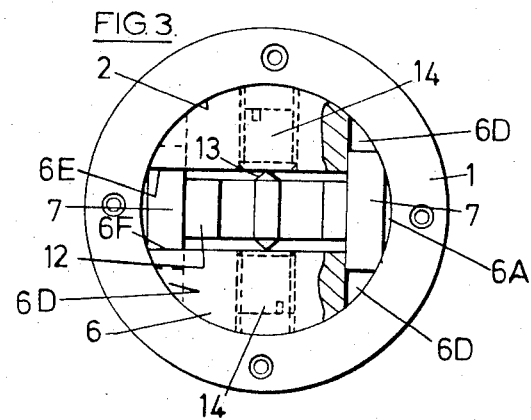
FIG. 3 is an end view partly in section of the flowmeter of FIG. 1 looking in the direction of the arrow A, the cover plate 15 being removed to reveal the interior of the meter.

Referring now to FIGS. 4 and 5 there is shown a flowmeter of similar form to that of FIGS. 1 to 3, (details of the inductive sensor being omitted) but in this case the meter incorporates means to deflect a flow of fluid entering the rotor chamber from the normal outlet passage 9, so that the flowmeter can be safely cleaned by a reverse flow of steam.

In the illustrated embodiment this takes the form of a baffle member 25, more clearly shown in FIG. 6. The member consists of a stainless steel clip which is sprung over the rods 7 adjacent the inlet and outlet openings to the chamber. A notch 25A is cut in the clip to allow unimpeded flow from the nozzle 8 under normal operating conditions, leaving the portion 25B occluding the mouth of passage 9.

The flow under normal forward flow conditions i.e. flow measuring conditions, is indicated by the arrows in FIG. 4; fluid enters the rotor chamber from nozzle 8 to impinge on the rotor 12 substantially tangential thereto, rotating the rotor exactly as in the FIGS. 1 to 3 examples. The fluid flows around the chamber and divides around portion 25B of the baffle member to exit from the chamber via outlet passage 9. It has been estimated that the linearity of a flowmeter constructed substantially as illustraed is only reduced under normal conditions to about 1% from 1/2% by the inclusion of the baffle member 25, i.e. for most practical purposes the baffle has a neglagable effect on the measuring characteristics of the meter and can thus safely be left in the meter at all times — not just inserted when cleaning is to be carried out.

In FIG. 5 is indicated the flow during cleaning, i.e. when steam is applied to the meter at the normal outlet connection 4. As can be seen the flow divides upon entering the rotor chamber and it has been found that in a flowmeter constructed substantially as illustrated the net effect of the flow passing to the nozzle 8 along the two paths indicated is that virtually no rotation is imparted to the rotor.

The baffle member may of course take other forms than that shown in the illustrative embodiment. For example it may be prismatic, e.g. triangular, arranged in the region of the outlet opening to the chamber with an apex pointing upstream in the reverse sense of fluid flow.

I claim:

1. A fluid flowmeter comprising:
 a body defining a chamber of substantially rectangular cross-section having four side walls extending between substantially parallel top and bottom walls;
 a metering rotor having radially-directed, axially extending blades borne for rotation with said chamber;
 means defining a fluid inlet and a fluid outlet, opening to said chamber through the same of different side walls of the chamber;
 said inlet including a nozzle for directing a jet of incoming fluid towards and substantially tangential to the rotor;
 means arranged within the chamber for guiding such incoming fluid around the chamber to the outlet which means comprises:
 a rod like member extending between said top and bottom walls of the chamber situated in one or more corners of the chamber, the axis of the or each such member being substantially parallel with that of the rotor;
 and means for sensing the number of revolutions of the rotor to signal the amount of fluid passed.

2. The flowmeter of claim 1 wherein a rod-like member is situated in each corner of the chamber encountered by fluid flowing around the chamber from said inlet to said outlet.

3. The flowmeter of claim 2 wherein the nozzle is in the form of an eccentrically bored insert borne in a side wall of the chamber so that the alignment of the nozzle is adjustable relative to the rotor by rotation of said insert.

4. The flowmeter of claim 1 wherein said inlet and outlet open into the chamber through the same side wall of the chamber, and a rod-like member is situated in one or both of the two corners remote from said same side wall.

5. The flowmeter of claim 1 wherein said inlet and outlet open into the chamber through the same side wall of the chamber, at positions spaced from the next nearest side wall and a rod-like member is situated in one or both of the two corners adjacent to said same side wall.

6. The flowmeter of claim 1 wherein at least one rod-like member is adjustable as to its position.

7. The flowmeter of claim 6 wherein said member is borne eccentrically in said top and bottom walls of the chamber so that the member is adjustable as to its position by rotation thereof.

8. The flowmeter of claim 1 wherein the alignment of said nozzle relative to the rotor is adjustable.

9. The flowmeter of claim 1 wherein at least one rotor blade embodies a magnetic element in its tip to cause pulses in an inductive sensor in proximity to the chamber, thereby sensing the number of revolutions of the rotor.

10. The flowmeter of claim 1 wherein means are provided in the region of the outlet opening to the chamber to deflect a flow of fluid entering the chamber from the outlet from impingement on the rotor sufficient to overspeed the same.

11. The flowmeter of claim 10 wherein said deflecting means comprises a baffle member arranged to partially occlude the outlet opening so as to direct a flow of fluid entering the chamber from the outlet around the chamber to the inlet with components of direction tending to rotate the rotor in both senses, any net rotation being within the normal operational range of the rotor.

12. The flowmeter of claim 11 wherein said inlet and outlet open into the chamber through the same side wall of the chamber, at positions spaced from the next nearest side wall, and a rod-like member is situated in each of the two corners adjacent to said same side wall, said baffle member being in the form of a clip sprung over said two rod-like members, the clip being notched to allow unimpeded forward flow from the inlet but leaving a portion partially occluding the outlet opening.

13. The flowmeter of claim 11 wherein said baffle member is prismatic with an apex pointing upstream in the reverse sense of fluid flow.

* * * * *